(12) United States Patent
Volftsun et al.

(10) Patent No.: US 10,167,183 B1
(45) Date of Patent: Jan. 1, 2019

(54) SYSTEM AND METHOD FOR BEVERAGE DISPENSING

(71) Applicants: Lev Volftsun, McLean, VA (US); Alex Kushnir, Sterling, VA (US); Alex Belfor, Fairfax, VA (US)

(72) Inventors: Lev Volftsun, McLean, VA (US); Alex Kushnir, Sterling, VA (US); Alex Belfor, Fairfax, VA (US)

(73) Assignee: SESTRA SYSTEMS, INC, Sterling, VA (US)

( * ) Notice: Subject to any disclaimer, the term of this patent is extended or adjusted under 35 U.S.C. 154(b) by 54 days.

(21) Appl. No.: 15/424,478

(22) Filed: Feb. 3, 2017

Related U.S. Application Data

(63) Continuation-in-part of application No. 15/331,117, filed on Oct. 21, 2016, and a continuation-in-part of application No. 14/686,597, filed on Apr. 14, 2015.

(51) Int. Cl.
  *B67D 1/10* (2006.01)
  *B67D 1/00* (2006.01)
  *B67D 1/12* (2006.01)

(52) U.S. Cl.
  CPC .......... *B67D 1/102* (2013.01); *B67D 1/0012* (2013.01); *B67D 1/12* (2013.01)

(58) Field of Classification Search
  CPC ......... B67D 1/12; B67D 1/0012; B67D 1/102
  USPC .................. 222/52, 249; 141/1, 83, 192; 73/1.16–1.36
  See application file for complete search history.

(56) References Cited

U.S. PATENT DOCUMENTS

| | | | | |
|---|---|---|---|---|
| 928,588 A * | 7/1909 | Cornish | ............... | B67D 1/0084 137/625.46 |
| 1,144,583 A * | 6/1915 | Brown | ..................... | G01F 11/04 137/625.43 |
| 1,904,829 A * | 4/1933 | Hurlbrink | ............... | B67D 7/166 222/249 |
| 3,216,627 A * | 11/1965 | Best | ....................... | B67D 1/103 222/249 |
| 3,344,667 A * | 10/1967 | Maltby | ..................... | G01F 3/16 250/231.1 |
| 3,370,759 A * | 2/1968 | Johansson | ................. | B65B 3/32 222/249 |
| 3,530,873 A * | 9/1970 | Arp | ....................... | A61M 16/12 128/205.11 |

(Continued)

FOREIGN PATENT DOCUMENTS

GB            1342285            1/1794

*Primary Examiner* — Patrick M Buechner
*Assistant Examiner* — Michael J Melaragno
(74) *Attorney, Agent, or Firm* — John D Gugliotta

(57) ABSTRACT

A system and method for the automated dispensing of bulk keg wine is provide having, in combination: integrated temperature control; pressure monitoring; automated purging; and integrated point of sale data acquisition for determining inventory usage statistics for each keg of wine dispensed. The system provides for precise measurement of each portion. Control algorithms for adapting system operation provide anticipated travel time and distances, and anticipated dispensed volumes and volumetric flow rates to allow for precise control of selected pour volumes. A relationship is calibrated among applied pressure, piston delay time, and dispensed per push volume to achieve higher control accuracy between a maximum and minimum system pressure ranges.

10 Claims, 4 Drawing Sheets

(56) References Cited

U.S. PATENT DOCUMENTS

| | | | | |
|---|---|---|---|---|
| 3,552,606 A | | 1/1971 | Kraft et al. | |
| 3,565,287 A | * | 2/1971 | Johnston | G01F 11/04 222/249 |
| 3,612,360 A | * | 10/1971 | Ambrose | B01L 3/0206 222/340 |
| 3,776,252 A | * | 12/1973 | Wilcox | F04B 13/02 137/101.25 |
| 3,830,405 A | | 8/1974 | Jaeger | |
| 3,831,821 A | * | 8/1974 | Doyen | B65B 3/32 137/540 |
| 3,870,089 A | * | 3/1975 | Laub, III | B65B 57/06 141/115 |
| 4,240,291 A | * | 12/1980 | Andersson | G01P 5/18 73/239 |
| 4,304,736 A | * | 12/1981 | McMillin | B01F 3/0473 222/129.1 |
| 4,386,716 A | * | 6/1983 | Buck | G05D 11/001 222/134 |
| 4,491,248 A | * | 1/1985 | Blackwell | G01F 11/04 222/249 |
| 4,638,924 A | * | 1/1987 | Newsom | A01C 23/042 137/106 |
| 4,661,321 A | * | 4/1987 | Byrd | B01F 3/088 222/249 |
| 4,736,873 A | * | 4/1988 | Patriquin | B67D 1/104 137/625.6 |
| 4,831,866 A | * | 5/1989 | Forkert | B67D 7/085 700/283 |
| 4,927,567 A | * | 5/1990 | Rudick | B01F 3/04269 261/104 |
| 4,967,936 A | * | 11/1990 | Bingler | B67D 1/0031 222/129.2 |
| 5,381,926 A | | 1/1995 | Credle, Jr. et al. | |
| 5,829,633 A | * | 11/1998 | Emmerich | G01F 11/16 222/1 |
| 6,672,481 B2 | * | 1/2004 | Ziesel | B67D 1/0007 222/129.1 |
| 7,716,963 B2 | * | 5/2010 | Bell | G01F 25/0007 73/1.23 |
| 8,479,955 B2 | | 7/2013 | Vesborg et al. | |
| 2001/0039969 A1 | * | 11/2001 | Needham | F16K 27/041 137/628 |
| 2002/0113087 A1 | * | 8/2002 | Ziesel | B67D 1/0007 222/129.1 |
| 2008/0189078 A1 | | 8/2008 | Vok et al. | |
| 2008/0202148 A1 | | 8/2008 | Gagliano | |
| 2009/0013753 A1 | * | 1/2009 | Bell | G01F 1/8436 73/1.16 |
| 2010/0089943 A1 | | 4/2010 | Till | |
| 2013/0253872 A1 | * | 9/2013 | Curtis | G01F 25/0007 702/100 |
| 2015/0027665 A1 | | 1/2015 | Cooke | |
| 2016/0257549 A1 | * | 9/2016 | Volftsun | B67D 1/0007 |
| 2017/0096322 A1 | * | 4/2017 | Volftsun | B67D 1/0007 |

* cited by examiner

SYSTEM AND METHOD FOR BEVERAGE DISPENSING

RELATED APPLICATIONS

The present invention is a Continuation in Part of the Beverage Dispensing System of U.S. Ser. No. 15/331,117, filed on Oct. 24, 2016, which was a continuation in part of U.S. Ser. No. 14/686,820 (also filed as PCT/US16/27175), all of which are incorporated by reference as if fully rewritten herein.

BACKGROUND OF THE INVENTION

1. Field of the Invention

The present invention relates to methods for improved operation in the metering of dispensed beverages and, more particularly, to an improved operation of the Beverage Dispensing System of the type described, taught or anticipated by or within the Related Applications or their equivalents.

2. Background of the Related Art

In utilizing a reciprocating piston metering chamber in which a selected, desired total dispensed volume is achieved through the use of multiple piston cycles, a problem exist in the delivery of a continuous or near-continuous stream of fluids. Achieving a selected multiple of incremental volumes to form a desired volume is not, by itself, an issue. A user can provide the desired volume by delivering multiple piston strokes, one after another. To do so a user could merely provide a contact sensor to signal the terminus of each cycle, and count successive cycles until the desired volumetric total is achieved.

In practice, problems associated with such a scheme arise quickly when, intra alia: the incremental volumes are relatively small; flow rates (and accompanying piston speed) are relatively fast; sensor and/or microprocessor response times are not instantaneous; and valve actuation require shutoff times that are not instantaneous. In addition, because of manufacturing tolerances, the piston diameter does not match perfectly to the internal cylinder diameter. As a result, there is a small gap between the piston and the cylinder and a liquid may leak through such a gap, referred to as "blow by".

These and other conditions generally result in an inability to control, with certainty, specific volumetric dispensing on an accurate and repeatable basis to a level of commercial viability. The summation of all these micro-variations in control can appear and the result is that the dispenser of a metered, pressurized flow of beverage must compromise with: an excruciatingly (i.e. non-commercially acceptable) slow flow rate; a noncontinuous, 'pulsating' flow of fluid resulting from start-stop-reverse actions of a metering piston; non-repeatable pours; or pours having a large variability of volumes about an average or target.

Consequently, a need exists for improved systems for and methods of operating beverage dispensing systems having metered, tracked, controlled and continuous dispensing volumes.

SUMMARY OF THE INVENTION

It is a specific object of the present invention to provide an improved method for operating a Beverage Dispensing System of the type described, taught or anticipated by or within the Related Applications.

It is a broad object of the present invention to provide broadly or equivalently an improved system for operating or controlling any equivalent or operationally similar mechanism having a reciprocating metering piston within a metering chamber.

According to one aspect of the present invention, the piston in the metering chamber of a Beverage Dispensing Device of a type broadly equivalent within the Related Applications is controlled for precise and repeatable pour control. Proposed algorithms for adapting system control provide anticipated travel time and distances, and anticipated dispensed volumes and volumetric flow rates to allow for precise control of selected pour volumes.

According to another aspect of the present invention, a system and method for the automated dispensing of bulk keg wine is provide having temperature control, pressure monitoring, and integrated point of sale data acquisition for determining inventory usage statistics for each keg of wine or spirits dispensed. The system provides for precise measurement of each portion. Control algorithms for adapting system operation provide anticipated travel time and distances, and anticipated dispensed volumes and volumetric flow rates to allow for precise control of selected pour volumes. A relationship is calibrated among applied pressure, piston delay time, and dispensed per push volume to achieve higher control accuracy between a maximum and minimum system pressure ranges. Control of the system metering piston may then be determined based upon both sensor inputs as well as calculated, anticipated piston travel.

It is an advantage of the present invention to improve the the dispensing of a metered, pressurized flow of beverage.

It is another advantage of the present invention to improve such beverage dispensing to decrease a dispensing cycle.

It is yet another advantage of the present invention to provide beverage dispensing as a non-pulsating flow of fluid.

Further advantages of the present invention provide improved accuracy and repeatability, and decrease variability of volumes for dispensed beverages.

Further objects, features and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
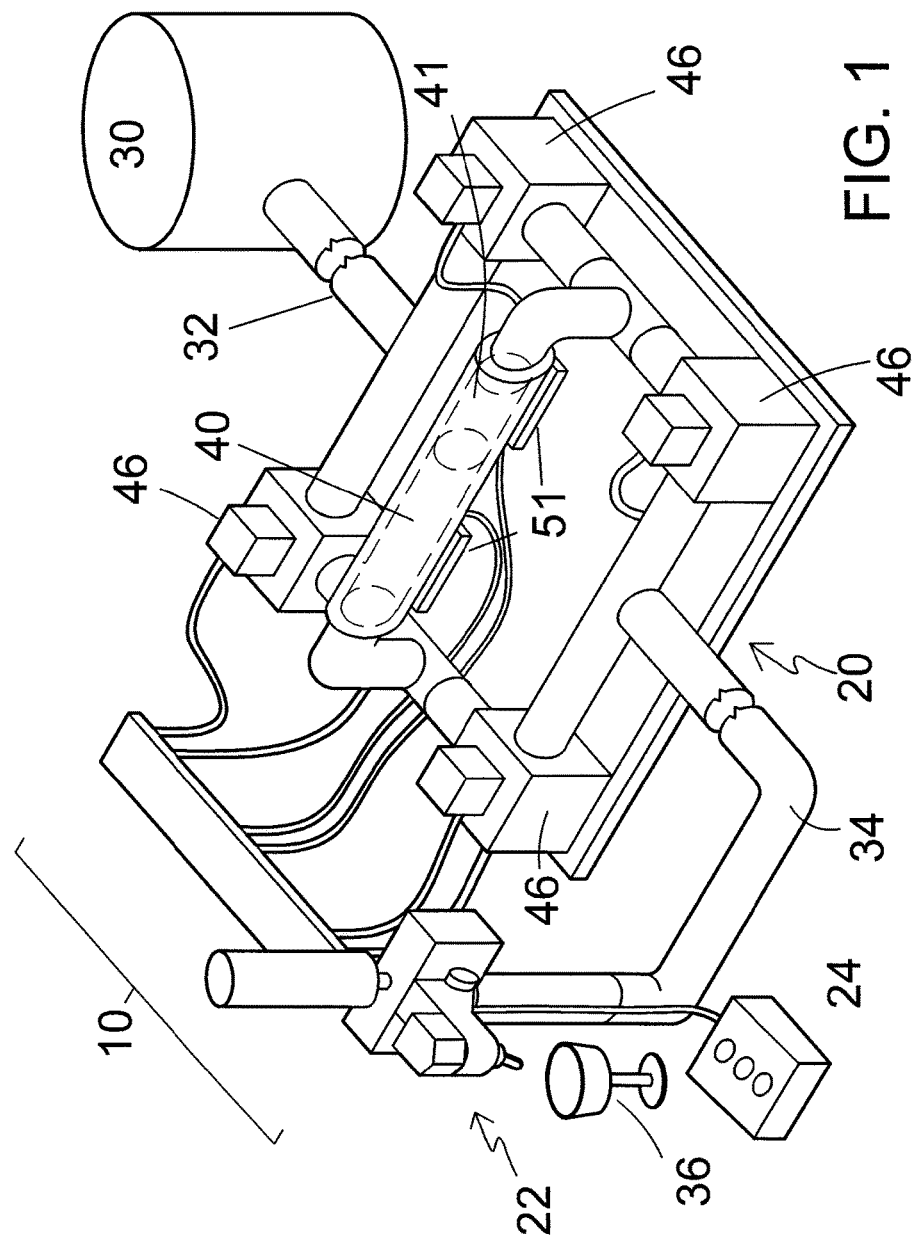
FIG. 1 is a perspective schematic view of a beverage dispensing and pour control system 10 for use with a metering system 20 according to an exemplary preferred embodiment of the present invention.

The best mode for carrying out the invention is presented in terms of its preferred embodiment, herein depicted within the Figures.

1. Detailed Description of the Figures

Before explaining the present invention in detail, it is important to understand that the invention is not limited in its application to the details of the construction illustrated and the steps described herein. The proposed systems and methods, in the present enablement of the preferred embodiment, is intended to ensure precision volumetric control of a Beverage Dispensing System of the Related Applications, or the broad eq uivalent thereof. As will be shown and described herein below, such improved and precise operation of controlling dispensed beverages may be accomplished through anticipatory control of alternating reversing actions of a dispensing piston such as to allow for repeatability and control at various pressures and in the face of operational anomalies that invariably occur in various real world operational theaters. It is to be understood that the phraseology and terminology employed herein is for the purpose of description and not of limitation, and should be broadly construed for the intended purpose.

According to a preferred embodiment of the present invention, an improved method is provided that insures the dispensing of precise volume of liquid by controlling the delay in reversing the direction of a piston in the metering chamber of the Beverage Dispensing System. Referring now to FIG. 1-4, a beverage dispensing and pour control system or "system", generally noted as 10, is shown according to a preferred embodiment of the present invention. The system 10 may include: a metering mechanism 20; a tap or spigot 22; and a beverage bulk storage and distribution system 30. Generally, the metering mechanism 20 is in fluid communication with a beverage supply 32 in operative connection with the bulk storage and distribution system 30. The metering mechanism 20 also provides for a metered discharge 34 in fluid communication with the tap or spigot 22 in a manner that provides for a beverage specific controlled metered pour into a beverage container 36, as will be described in greater detail below.

The metering mechanism 20 for use in the beverage dispensing and pour control system 10 of the present invention includes a metering chamber 40 that functions as a line pressure powered bi-directional dispenser by redirecting the pressure from one end of the chamber to the other end. Such a chamber 40 allows for accurate, repeatable metering, utilizing and preserving line pressure without the inclusion of an additional pumping device. A piston 41 within the chamber provides a displacement urging force by shuttling back and forth within the chamber 40 according to directed fluid pressure. Such operation will be described in greater detail below.

The metering mechanism 20 may further be in electronic communication and control with a user interface 24 providing in combination for operational control of the metering mechanism 20 for delivering a metered volume of liquid to the tap 22 in a control, contiguous manner. The metering mechanism 20 may further include wireless communication capability to communicate with a standard PC or smartphone using the wireless protocol (such as Bluetooth, Wi-Fi, Internet, etc.).

Bulk beverages from a number of sources 30 may be metered upon demand as urged through the metering chamber 40. Each cycle of the piston 41 may be correlated to an identified volume by a single system pressure generated from fluid communication with the bulk beverage container 30

The chamber 40 is shown embodied as a cylindrical container; however, it should be noted that such a shape and configuration is not intended to be limiting to the present invention. According to a preferred aspect of the present invention, a determined displacement for each piston cycle or partial piston cycle may be equal to the volume of a component of a desired beverage pour plus the volume associated with the piston 41. This allows for a the defined volume of the poured beverage to comprise one or more determined displacements or partial piston cycles. Further still, according to yet another aspect of the present invention the defined total discharge volume of a desired beverage pour may be equal to a fraction of, or multiples, or a combination thereof of a piston stroke, thereby requiring multiple reciprocating cycles to make up a total dispensed volume.

The internal volume 42 houses and contains a piston 41 adapted to match the cross sectional shape of the chamber 40. The piston 41 freely moves laterally, as urged, in a reciprocating manner about the internal volume 42. As should be apparent to a person having ordinary skill in the relevant art, while the piston 41 must move freely within the chamber 40, it must further be formed of sufficiently tight enough tolerances to prevent leakage that could otherwise create an error is determining any specifically dispensed volumes. As necessary, piston face surfaces or sealing surface may include a surface sealing mechanism, such as, for example, a ring seal channel or channels that contain and an elastomeric ring type seal.

As described above, the metering mechanism 20 provides for a fluid communication input from the beverage supply 32, and a fluid communication discharge to the metered discharge 34. According to a preferred embodiment of the present invention, an input 32 is in connection with the beverage supply further includes a flow splitter that directs a flow conduit to each egress port. Similarly, an outlet 34 is in connection with the metered discharge and further includes a similar flow splitter that directs a flow conduit from each egress port. Switching valves 46 operatively connected between the input 32, outlet 34 and metering cylinder 40 in order to provide alternating and symmetric flow paths through the metering cylinder 40. As should be apparent to a person having ordinary skill in the relevant art, in light of the present disclosure, the particular arrangement of valves and flow splitters may be adapted to a number of configurations, as long as existing line pressure is maintained while flow is alternately redirected between the opposite sides of the chamber 40 without changing or adding the pressure setup in-line. By way of example, and not as a limitation, alternate configurations may be accomplished with 2-way valves; 3-way valves; 4-way valve; or an equivalent manifold configuration incorporating another means of redirecting pressure.

The metering cylinder 40 may further include a sensor or a number of sensors for identifying and determining the characteristics of the motion of the piston 41. This may be speed, location, position, direction or the like. Sensors 51 such as IR proximity sensors may detect the presence of the piston 41. Sensors 51 such as Hall Effect sensor may detect the presence of the target within the piston 41, herein a magnet, between cycles. While shown with sensors at each end of the metering chamber 40, any number of sensors may be so used to provide incremental detection along the linear length of the chamber 40. A magnetostrictive sensor may alternately be used to continuously detect the position of the piston 41.

It should be noted that the above described configurations and examples are provided for enabling a preferred embodiment, but are not intended to be comprehensive or limiting. It should be apparent to a person having ordinary skill in the relevant art, and especially those in the hospitality industries in which the commercial dispensing of regulated beverages in medium, large or outdoor live hospitality venues, that the particular configurations may vary from those examples provided, but that such variation should be considered within a broad scope of equivalents that is and is intended to be within the present invention. Adaptations in hydraulic flow path or electrical control schema would be foremost considered as with such range of equivalents. However, such adaptations should not be considered exhaustive in that other variations or adaptations may be included while still incorporating the key aspects of the present inventive function.

Figure 2:
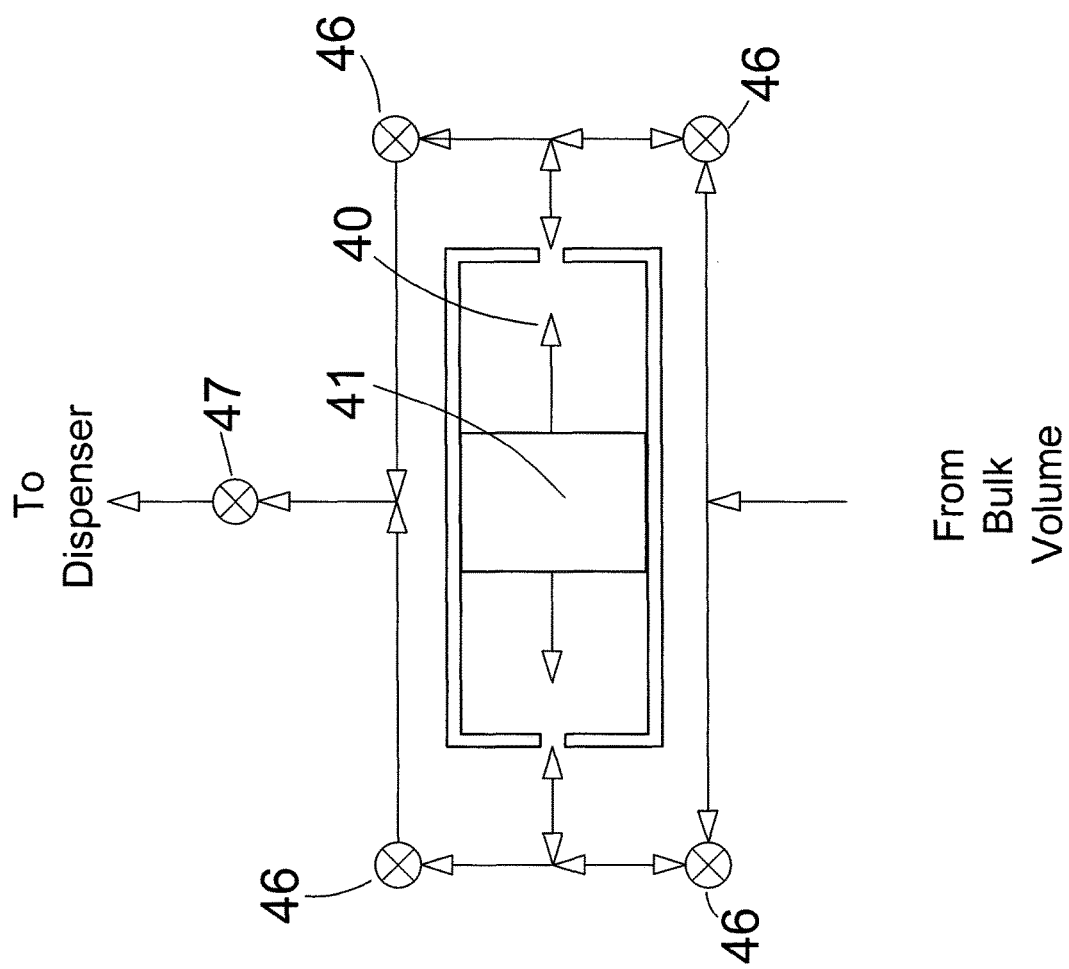
FIG. 2 is a general operational schematic for the beverage dispensing and pour control system 10 of the preferred embodiment of the present invention.

The general operation of the present invention may be most easily described in conjunction with FIG. 2. As shown, fluid from a bulk volume is metered to a dispenser through a metering system formed of a bi-directional metering piston 41 oscillating within a metering chamber 40. With the displacement during a single cycle of the piston 41 being of a known volume, a dispensed fluid volume may be metered through the aggregation of successive displacement volumes. By controlling the valves 46, pressure can be directed and redirected to move the piston to one side or the other, and there by displacing the fluid at the opposite side. By controlling the cycling of the valves and allowing for hydraulic shoot-through during opening and closing of the valves, the aggregation of successive displacement volumes may be accumulated rapidly enough that the total dispensed pour form the tap appears to be of a single, continuous flow, rather than an intermittent start-stop that would result from other metering configurations.

Figure 3:
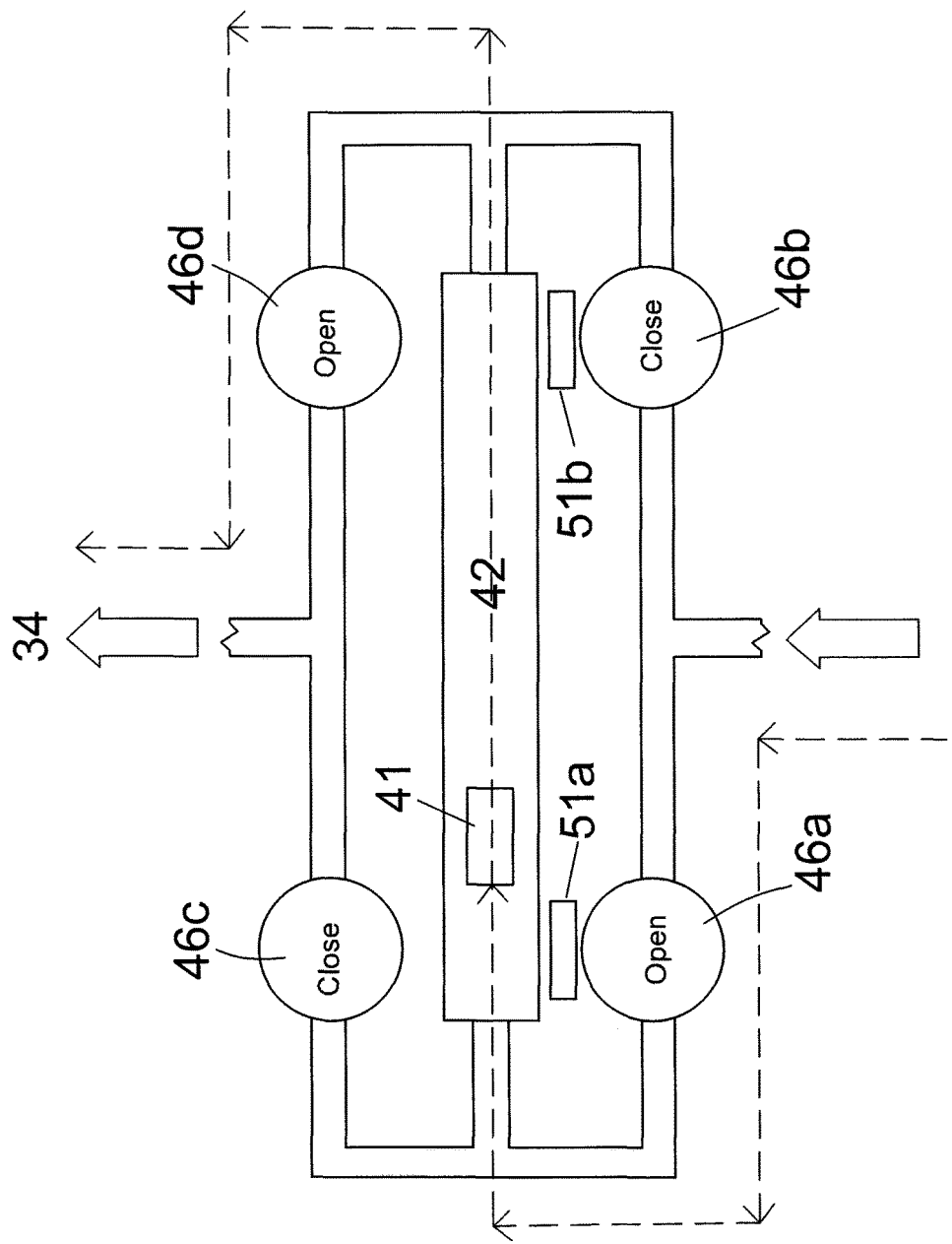
FIG. 3 is a hydraulic schematic of the a beverage dispensing station 10 of FIG. 1 for use according to the present invention showing a first dispensing cycle.
Figure 4:
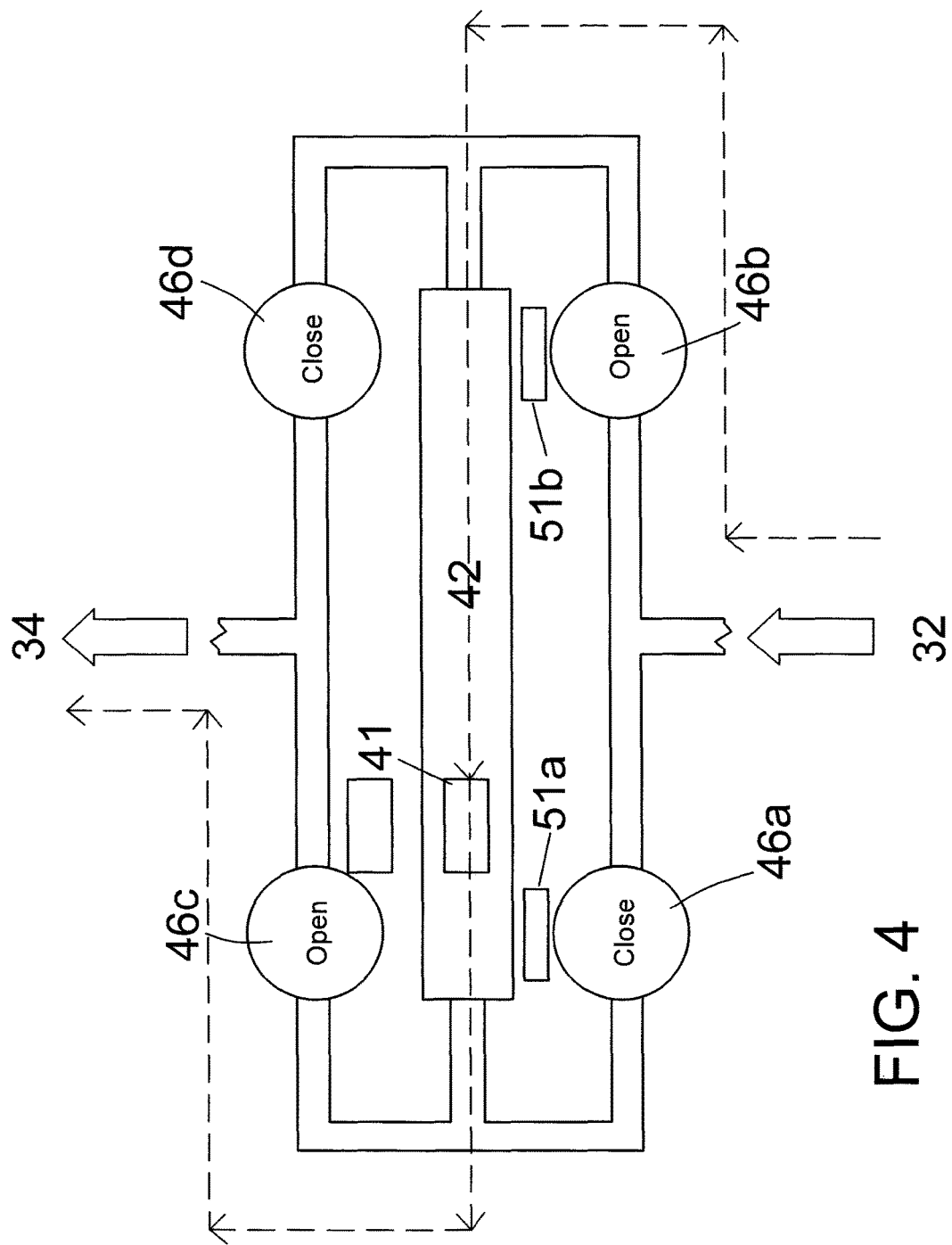
FIG. 4 is a hydraulic schematic of the beverage dispensing station 10 of FIG. 1 for use according to the present invention showing a second dispensing cycle.

Referring in conjunction with FIGS. 3 and 4, a hydraulic schematic of an exemplary typical operation of a beverage dispensing and pour control system 10 for use according to the present invention is shown. As shown in FIG. 3, a first portion is metered from the inlet 32 under line pressure and directed to a first inlet of the chamber by positioning of one valve 46a open and another valve 46b closed. Closure of valve 46c forces fluid in to the chamber 40 and caused the piston 41 to move from a first position to a second position. The opening of valve 46d causes fluid originally in the chamber 40 to be dispensed out through the outlet 34. As shown in FIG. 4, subsequent metered volumes can be discharged by reversal of valve positions 46a, 46b, 46c, and 46d. It is envisioned that the valves 46 may be controlled by a dedicated collocated or remote microcontroller.

2. Operation of the Preferred Embodiment

In the Beverage Dispensing System based on the piston pump design (FIG. 1), the beverage liquid under pressure is delivered by the series of piston 41 movements inside the cylinder 40 as shown and described. As each piston is moved or pushed, a measured amount of liquid is dispensed with a high accuracy as long as accurate control of the piston can be maintained (i.e. starts/stops/reverses). In such a system, repeatable dispensing of precise volumes of liquid is affected by the reversing the direction of a piston in the metering chamber. The travel speed of such a piston results in an inability to rely on control sensor inputs reactively for control. Rather, sensor inputs are used for anticipatory control.

The liquid under pressure enters the system through from the bulk/keg source 32 and exits through an outlet conduit 34. Valves 46a, 46b, 46c and 43d control movements of piston 41. Opening valves 46a and 46d and closing valves 46b and 46c at the same time forces piston 41 to move right (see FIG. 3). Opening of valves 46b and 46c and closing of valves 46a and 46d reverses the piston 41 direction (see FIG. 4). Piston position is detected by sensors 51a and 51b. When a sensor detects the piston arrival it sends a signal to the control program to reverse the direction of the piston movement. Several such piston pushes consecutively dispense the predefined liquid volume.

The actual volume of liquid dispensed at each push depends on the initial and the final positions of the piston 41 as well as other important factors including, inter alia:

The liquid leaking between the piston and the cylinder internal inner surface (blow-by volume); and The liquid passing through all four valves 46 during a short period of time when one pair of valves is closing and the other pair of valves is opening (shoot-through volume).

These blow-by and shoot-through volumes cannot be measured directly. However, by applying calibration algorithms that allow for anticipatory control of the movement of the piston 41 it is possible to calculate a combined volume dispensed during each push with an adequate accuracy.

The pressure applied to a liquid may be variable, such as, for example, when pressure is generated by a compressor. The compressor does not work continuously, but only when the compressor's sensor detects that a pressure drops below a predefined threshold will the compressor's pump activate. When a liquid is being dispensed via such compression, the liquid's pressure drops with each consecutive push, and that in turn affects a volume dispensed at each push. In order to accommodate for such variations the present anticipatory control methodology provides an estimate of the current pressure and adjust parameters for every piston push in order to ensure that a desired predefined volume of liquid has been dispensed by the end of a pour.

With higher the pressures applied to the liquid, the metering piston will in turn move faster along the cylinder and will require a longer piston breaking distance. Similarly, in such operation the metering piston may exhibit higher bypass and shoot-through volumes. According to the present method, the applied pressure may be estimated by measuring a time that it takes the piston to span a distance between the first sensor (departure event) and the second sensor (arrival event). Knowing the pressure, the control program can calculate a delay time D between the arrival event and the moment when a direction of the piston movement is reversed. The longer this delay time the higher the volume of liquid dispensed during the push.

In application according to the preferred embodiment of the present invention, the control system is adapted to include, generally: calibration; and, control of shoot-through volumes that cannot be measured directly by calculating a combined volume dispensed during each push with an adequate accuracy.

Algorithm 1.

The system is first calibrated at a minimum pressure $P_{min}$ and then the process is repeated at a maximum pressure $P_{max}$. On each phase of calibration an operator first finds empirically the delay D, defining the wait time before reversing the direction of the piston after each arrival event, thereby ensuring that the volume of liquid dispensed during one push is equal to the desired volume.

The piston travel time T and the associated delay D are measured and recorded. For purposes of the present invention, piston travel time T should be broadly construed as the time interval associated with the piston transiting along the entire length of the metering chamber, from a departure event to an arrival event, or within the range of functional equivalents. For purposes of the present invention, piston delay D should be broadly construed as the time delay between the arrival event and the moment when a direction of the piston movement is reversed, or within the range of functional equivalents. Specifically, two pairs of parameters are determined: one pair for minimal pressure $P_{min}$ and one for maximum pressure $P_{max}$.

$D_{min}$, $T_{min}$
$D_{max}$, $T_{max}$

Once this calibration has been performed and the system is in the operation mode, the actual pressure of a liquid is expected to be between minimum and maximum values. Given the current measured piston travel time T, the piston delay D for each push is calculated using the linear interpolation between the minimum and the maximum pressure related values:

$$D=D_{max}+(D_{min}-D_{max})*(T-T_{max})/(T_{min}-T_{max})$$

Algorithm 2.

This algorithm takes in to account the differences in volumes dispensed during long and short pushes and is based on calculating delay D in changing the direction of the piston movement for each push, taking into account the changes in pressure from push to push. The algorithm assumes that the piston stops at the end of a cylinder after each pour.

The logic of the program controlling Beverage Dispensing System sets the last push of a pour to be long enough to ensure that the piston reaches the end of a cylinder and stops there. In this case a pour consists of two long pushes (the first and the last one) when the piston starts and stops at ends of the cylinder and a number of short pushes where the piston reverses the direction of its movement before reaching an end of the cylinder.

The calibration process starts with executing two long pushes with delay D=0 under a maximum and then under a minimum pressure and measuring the volume dispensed, as well as the corresponding piston travel time:

V_l_2_0_min=volume dispensed during 2 long pushes, zero delay D, and under minimum pressure;
T_l_2_0_min=corresponding piston travel time;
V_l_2_0_max=volume dispensed during 2 long pushes, zero delay D, and under maximum pressure; and
T_l_2_0_max=corresponding piston travel time.

Based on this calibration data, the long push volume V_l_2_0 is calculated using the linear interpolation method for any measured piston travel time T:

$$V\_l\_2\_0(T)=V\_l\_2\_0\_min+(V\_l\_2\_0\_max-V\_l\_2\_0\_min)*(T\_l\_2\_0\_min-T)/(T\_l\_2\_0\_min-T\_l\_2\_0\_max) \quad (1).$$

The next phase of the Calibration is performed with the maximum piston delay $D=D_{max}$ but still allowing for a smooth pouring:

V_l_2_$D_{min}$=volume dispensed during 2 long pushes, delay $D_{max}$, and under minimum pressure;
T_l_2_$D_{min}$=corresponding piston travel time;
V_l_2_$D_{max}$=volume dispensed during 2 long pushes, delay $D_{max}$, and under maximum pressure; and
T_l_2_$D_{max}$=corresponding piston travel time.

Based on this calibration data, the long push volume V_l_2_d is calculated using the linear interpolation method for any measured piston travel time T:

$$V\_l\_2\_d(T)=V\_l\_2\_D_{min}+(V\_l\_2\_D_{max}-V\_l\_2\_D_{min})*(T\_l\_2\_D_{min}-T)/(T\_l\_2\_D_{min}-T\_l\_2\_D_{max}) \quad (2).$$

Interpolating one more time between volumes corresponding to zero piston delay time and its maximum value, the actual volume delivered by two long pushes:

$$V\_l\_2(D)=V\_l\_2\_0+(V\_l\_2\_d-V\_l\_2\_0)*D/D_{max} \quad (3).$$

The next calibration phase measures volumes delivered by short pushes. First, four consecutive pushes are performed under a minimum and then maximum pressures, where the first and the last pushes are long, the second and the third pushes are short. Piston delay D is set to zero.

V_4_0_min=volume dispensed during 4 pushes, zero delay D, and under minimum pressure;
T_s_4_0_min=corresponding short push piston travel time;
V_4_0_max=volume dispensed during 4 pushes, zero delay D, and under minimum pressure; and
T_s_4_0_max=corresponding short push piston travel time.

In the last calibration phase the maximum delay $D=D_{max}$ is applied on each push:

V_4_$D_{min}$=volume dispensed during 4 pushes, delay $D_{max}$, and under minimum pressure;
T_s_4_$D_{min}$=corresponding short push piston travel time;
V_4_$D_{max}$=volume dispensed during 4 pushes, delay $D_{max}$, and under maximum pressure; and
T_s_4_$D_{max}$=corresponding short push piston travel time.

Since the pour with the 4 pushes consists of 2 long and 2 short pushes, the one short push dispensed volume is calculated as half of the differences between the corresponding volumes:

$$V\_s\_1\_0\_min=0.5*(V\_4\_0\_min-V\_l\_2\_0\_min)$$

$$V\_s\_1\_0\_max=0.5*(V\_4\_0\_max-V\_l\_2\_0\_max)$$

$$V\_s\_1\_D_{min}=0.5*(V\_4\_D_{min}-V\_l\_2\_D_{min})$$

$$V\_s\_1\_D_{max}=0.5*(V\_4\_D_{max}-V\_l\_2\_D_{max})$$

Using the same logic as in case of long pushes, the volume dispensed by one short push with zero piston delay D under some intermediate pressure defined by piston travel time T:

$$V\_s\_1\_0(T)=V\_s\_1\_0\_min+(V\_s\_1\_max-V\_s\_1\_0\_min)*(T\_s\_4\_0\_min-T)/(T\_s\_4\_0\_min-T\_s\_4\_0\_max) \quad (4).$$

Applying the maximum piston delay $D=D_{max}$ to all pushes under the same pressure as in the previous formula, the resulting volume is as follows:

$$V\_s\_1\_d(T)=V\_s\_1\_D_{min}+(V\_s\_1\_D_{max}-V\_s\_1\_D_{min})*(T\_s\_4\_D_{min}-T)/(T\_s\_4\_D_{min}-T\_s\_4\_D_{max}) \quad (5).$$

And, the volume delivered by one short push with the piston delay D is calculated as:

$$V\_s\_1(D)=V\_s\_1\_0+(V\_s\_1\_d-V\_s\_1\_0)*D/D_{max} \quad (6).$$

Equations (1) to (6) allow the program to calculate piston delays for each push so that the total dispensed volume during a pour matches the predefined pour volume V_pour. The algorithm consists of the following steps:

1. Measure a piston travel time T at the end of the first push and calculate the long and short push volumes V_l_2_0(T), V_l_2_d(T), V_s_1_0(T), V_s_1_d(T) using equations (1), (2), (4), (5);
   An assumption is made at this step of the algorithm that a pressure and piston travel time T will not change between pushes.
2. The total volume dispensed during the pour must match the expected pour volume V_pour;

$$V\_l\_2(D)+Ns*V\_s\_1(D)=V\_pour \qquad (7).$$

where Ns=number of short pushes in a pour;
   V_l_2=combined volume dispensed during the first and the last long pushes; and
   V_s_1=volume dispensed in one short push.
3. Substituting V_l_2(D) and V_s_1(D) with formulas (3) and (6), equation (7) can be resolved to find the piston delay D as follows:

$$D=D_{max}*(V\_pour-V\_l\_2\_0-Ns*V\_s\_1\_0)/V\_l\_2\_d-V\_l\_2\_0+Ns*(V\_s\_1\_d-V\_s\_1\_0))$$

4. Apply the calculated delay D at the end of the first push and save the long push volume V_l_2(D) calculated using formula (3) and the first push travel time T1:

$$V\_long=V\_l\_2\_0+(V\_l\_2\_t-V\_l\_2\_0)*D/D_{max};$$

$$T1=T;$$

$$V\_sum=V\_long;$$

where V_sum—the estimated volume dispensed during the first and last (future) pushes.
5. The pressure may be dropping with each consecutive push, therefore a short push volume and a corresponding piston delay should be recalculated at the end of each short push:

$$V\_pour-V\_sum=k*V\_s\_1 \qquad (8)$$

where k=the number of remaining short pushes.
6. Substituting V_s_1 with (6), the current value of D can be resolved from (8):

$$D=D_{max}*(V\_pour-V\_sum-k*V\_s\_1\_0)/(Ns*(V\_s\_1\_d-V\_s\_1\_0)) \qquad (9).$$

7. The volume dispensed during all completed pushes V_sum will be incremented after each push:

$$V\_sum=V\_sum+V\_s\_1(D)$$

8. Formula (9) may be applied for all short pushes except the last one. The volume dispensed in the first and the last long pushes was calculated based on the first piston travel time and since the pressure is dropped for the last push it must be recalculated. First, adjust the accumulated volume:

$$V\_sum=V\_sum-V\_long \qquad (10).$$

Then, recalculate the long push volume based on average piston travel time T_avg:

$$T\_avg=0.5*(T1+T\_last)$$

where T1—piston travel time in the first push;
   T_last—piston travel time in the last push.
   Using formula (3) calculate the volume dispensed in long pushes under the assumption that piston travel time is T_avg:

$$V\_l\_2\_avg=V\_l\_2\_0(T\_avg)+[V\_l\_2\_d(T\_avg)-V\_l\_2\_0(T\_avg)]D1/D_{max} \qquad (11)$$

where D1=piston delay time on the first push.

Applying formula (6) to the last short push:

$$V\_s\_last=V\_s\_1\_0(T\_last)+[V\_s\_1\_d(T\_last)-V\_s\_1\_0(T\_last)]*D\_last/D_{max} \qquad (12)$$

where D_last=piston delay that should be applied on the last short push.
Volume dispensed at the last short push can also be found as:

$$V\_s\_last=V\_pour-V\_sum-V\_l\_2\_avg \qquad (13)$$

where V_sum and V_l_2_avg are specified in (10) and (11).
Piston delay D_last that should be applied on the last push can be found from (12):

$$D\_last=D_{max}*[V\_pour-V\_sum-V\_l\_2\_avg-V\_s\_1\_0(T\_last)]/[V\_s\_1\_d(T\_last)-V\_s\_1\_0(T\_last)] \qquad (14).$$

Applying the algorithm to each push and calculating piston delay D for each push should ensure dispensing the predefined volume V_pour by the end of a pour.

Increasing Algorithm Accuracy.

If the accuracy of Algorithms 1 and 2 is insufficient for a particular application, it is possible to achieve a higher degree of accuracy at the cost of increasing complexity of calculations. Both algorithms assume that a relationship among applied pressure, piston delay time, and dispensed per push volume can be described by a linear function. This assumption may be valid for a limited range of pressure. In order to achieve a higher accuracy of algorithms the pressure range between $P_{min}$ and $P_{max}$ may be broken into several intervals and the same algorithm could be applied to each interval. Although the calibration process in this case requires more efforts it will provide a higher accuracy of calibration.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company*, v. *Hilton Davis Chemical*, 520 US 17 (1997) or *Festo Corp.* v. *Shoketsu Kinzoku Kogyo Kabushiki Co.*, 535 U.S. 722 (2002), or other similar caselaw or subsequent precedent should not be made if any future claims are added or amended subsequent to this Patent Application.

What is claimed is:

1. A method of controlling fluid flow through a reciprocating piston metering dispenser comprising:
   a. calibration of piston travel time for minimal system pressure and maximum system pressure;
   b. calibration of piston delay time for minimal system pressure and maximum system pressure; and
   c. controlling piston start and stop based upon calculation of piston termination location taking into account changes in pressure between reciprocation according to said calibrations;
wherein successive discharges from said metering dispenser as urged by said piston provides for a fluid communication output with a continuous metered discharge.

2. The method of controlling fluid flow through a reciprocating piston metering dispenser of claim 1, wherein said calibrations are linear over a single operating pressure range.

3. The method of controlling fluid flow through a reciprocating piston metering dispenser of claim 1, wherein said calibrations are performed over multiple operating pressure ranges.

4. The method of controlling fluid flow through a reciprocating piston metering dispenser of claim 3, wherein said calibrations are linear over each individual said operating pressure ranges.

5. A method for dispensing and controlling the pour for beverages comprising:
   a. providing at least one beverage from a bulk storage distribution system and at an elevated pressure;
   b. controlling a continuous flow of a dispensed volume by filling a fixed volume chamber with said beverage, said beverage being urged to said fixed volume chamber by said elevated pressure; and
   c. urging said fixed volume of beverage in fluid communication with a tap or spigot by displacing said fixed volume chamber multiple times in series with subsequent beverage being urged to said fixed volume chamber by said elevated pressure;
wherein control of said continuous flow of a dispensed volume is calibrated with and adapted by calculation of piston delay time and dispensed per push volume are calibrated by a linear function between at least one applied pressure range between $P_{min}$ and $P_{max}$.

6. The method for dispensing and controlling the pour for beverages of claim 5, wherein calculation of piston delay time and dispensed per push volume are calibrated by a linear function of more than one applied pressure range between $P_{min}$ and $P_{max}$.

7. The method of claim 5, wherein said fixed volume chamber further comprises a dual reciprocating piston that forms a continuous flow metering dispenser that is urged between a first position at a first end of said chamber to a second position at a second end of said chamber.

8. The method of claim 6, wherein said fixed volume chamber further comprises a dual reciprocating piston that forms a continuous flow metering dispenser that is urged between a first position at a first end of said chamber to a second position at a second end of said chamber.

9. The method of claim 5, wherein calibration and adaptation of said piston delay time and dispensed comprises the steps:
   a. Measure a piston travel time T at the end of the first push and calculate the long and short push volumes;
   b. Calculating a total volume dispensed during the pour by aggregating said long and short push volumes as an expected pour volume;
   c. Determining a piston delay;
   d. Applying said determined piston delay at the end of the first push;
   e. Recalculating a piston delay at the end of each short push; and
   f. Calculating a total volume dispensed during all completed pushes by aggregating all increments after each push.

10. The method of claim 9, wherein calibration and adaptation of said piston delay time and dispensed is further adjusted in the event of a change in pressure and further comprising the steps:
   g. adjusting said total volume based on the first piston travel time and pressure drop for a last push.

* * * * *